(12) United States Patent
Huang et al.

(10) Patent No.: US 12,314,857 B2
(45) Date of Patent: May 27, 2025

(54) METHOD AND DEVICE FOR DEEP NEURAL NETWORK COMPRESSION

(71) Applicant: Acer Incorporated, New Taipei (TW)

(72) Inventors: Juinn-Dar Huang, New Taipei (TW); Ya-Chu Chang, New Taipei (TW); Wei-Chen Lin, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 1066 days.

(21) Appl. No.: 17/241,572

(22) Filed: Apr. 27, 2021

(65) Prior Publication Data

US 2021/0357758 A1  Nov. 18, 2021

(30) Foreign Application Priority Data

May 15, 2020 (TW) ................................. 109116293

(51) Int. Cl.
*G06N 3/082* (2023.01)
*G06N 3/04* (2023.01)
*G06F 7/49* (2006.01)
*G06F 7/491* (2006.01)

(52) U.S. Cl.
CPC ............... *G06N 3/082* (2013.01); *G06N 3/04* (2013.01); *G06F 7/49* (2013.01); *G06F 7/491* (2013.01)

(58) Field of Classification Search
CPC .. G06N 3/082; G06N 3/04; G06F 7/49; G06F 7/491
USPC ......................................................... 706/25
See application file for complete search history.

(56) References Cited

U.S. PATENT DOCUMENTS

| | | | |
|---|---|---|---|
| 10,223,635 B2 | 3/2019 | Annapureddy et al. | |
| 10,621,424 B2 | 4/2020 | Lin | |
| 10,832,135 B2* | 11/2020 | Ji | G06N 3/045 |
| 11,568,254 B2* | 1/2023 | Lee | G06F 17/16 |
| 2020/0387782 A1* | 12/2020 | Hegde | G06N 3/082 |

FOREIGN PATENT DOCUMENTS

| | | |
|---|---|---|
| TW | 201128542 A | 8/2011 |
| TW | 201627923 A | 8/2016 |
| TW | 201943263 A | 11/2019 |

OTHER PUBLICATIONS

Molchanov et al, "Pruning convolutional neural networks for resource efficient inference", arXiv:1611.06440v2 [cs.LG] Jun. 8, 2017 (Year: 2017).*

He et al, "Structured pruning for deep convolutional neural networks: a survey", IEEE Transactions on pattern analysis and machine intelligence, vol. 46, No. 5, May 2024 (Year: 2024).*

(Continued)

*Primary Examiner* — Tsu-Chang Lee
(74) *Attorney, Agent, or Firm* — McClure, Qualey & Rodack, LLP (57) ABSTRACT

A method for deep neural network compression is provided. The method includes: using at least one weight of a deep neural network (DNN), setting a value of a P parameter, and combining every P weights in groups, and perform branch pruning and retraining, so that only one of each group has a non-zero weight, and the remaining weights are 0, wherein the remaining weights are evenly divided into branches to adjust a compression rate of the DNN and to adjust a reduction rate of the DNN.

18 Claims, 12 Drawing Sheets

(56) References Cited

OTHER PUBLICATIONS

Extended European Search Report dated Mar. 15, 2022, issued in application No. EP 21172345.7.
Kang, H.J.; "Accelerator-Aware Pruning for Convolutional Neural Networks;" IEEE; Apr. 2018; pp. 1-11.
Anwar, S., et al.; "Structured Pruning of Deep Convolutional Neural Networks;" ACM Journal on Emerging Technologies in Computing Systems; vol. 13; No. 3; Article 32; Feb. 2017; pp. 32:1-32:18.
Chinese language office action dated Nov. 30, 2020, issued in application No. TW 109116293.

* cited by examiner

A processor 100 obtains at least one weight of a deep neural network (DNN), sets a value of a P parameter, and combines every P weights in groups, wherein the weight is placed between two network layers corresponding to an input layer and an output layer adjacent to each other in the deep neural network, and The input values of the nodes of the input layer multiplied by the corresponding weight are equal to the output values of the nodes of the output layer ~S11

The processor sets a loop parameter L so that a branch pruning and retraining is performed on each group of P weights from the first loop to the Lth loop, and sets a threshold T corresponding to each loop, wherein the threshold T increases gradually from a first threshold T1 to an L threshold TL. The first threshold T1 is used at the beginning of the first loop, and the L threshold TL is used in the L loop ~S12

The processor sets the weights that are less than the threshold T to 0 and retains the weights that are greater than the threshold T when obtaining the weights of the same group in the same loop according to the threshold T, wherein when all of the weights of the same group in the same loop are less than the threshold T, only the largest weight is retained, and the remaining weights are set to 0, until the Lth loop of the last loop. Similarly, when all of the weights of the same group in the same loop are less than the threshold T in the L loop, only the largest weight is retained, and the remaining weights are set to 0 ~S13

The processor performs the branch pruning and retraining on the Lth loop of the last loop, so that only one weight of each group is non-zero and the remaining weights are 0, wherein the remaining weights are evenly divided into branches to adjust the compression rate of the DNN and to adjust the reduction rate of the DNN to 1/p ~S14

FIG. 10

METHOD AND DEVICE FOR DEEP NEURAL NETWORK COMPRESSION

CROSS REFERENCE TO RELATED APPLICATIONS

This application claims priority from Taiwan Patent Application No. 109116293, filed on May 15, 2020, the disclosure of which is incorporated herein by reference in its entirety.

BACKGROUND

Technical Field

The present disclosure generally relates to a compression method. More specifically, aspects of the present disclosure relate to a method and a device for deep neural network compression with uniform branch grouping.

Description of the Related Art

Deep learning has the highest accuracy in imaging, speech recognition, automatic driving, machine translation, etc. Almost all successful deep learning techniques are built on neural networks. DNN is the simplest neural network. The previous technology is usually connected by other neural networks such as CNN, RNN, LSTM, etc. After introducing DNN into the embedded platform, it has had a wide range of application influences on mobile computing. However, the size of DNN models is usually very large, sometimes close to 100 million bytes, which limits the improvement of large-scale models on IoT platforms and edge devices. For example, the CPU speed, memory and battery life of mobile computing platforms are limited. Therefore, these neural networks should be applied to these edge devices. Although the previous technology can reduce the parameters and reduce the amount of memory used, how to reduce the number of memory accesses and the amount of memory used while maintaining the original classification accuracy has become a problem to be solved in this technical field.

SUMMARY

The purpose of the present disclosure is to reduce the weight between two adjacent layers of a deep neural network (DNN) so as to reduce the number of storage devices required. The technical means of the present disclosure comprise layer-independent ratios and optional local regular weight pruning, byte-aligned weight packing formats, and layer-by-layer fixed-point optimization, an extremely simple and low-power decompressor hardware device comprising an address generator is just a counter without a codebook, and a memory for easy packing and unpacking of weights in byte alignment. The method and device for deep neural network compression provided in the present disclosure achieves the effect of low power loss.

The technical means used in the present disclosure to solve the problems of the conventional technology is to provide a method for deep neural network compression. The method includes: obtaining, by a processor, at least one weight of a deep neural network (DNN), setting a value of a P parameter, and combining every P weights in groups, wherein the weight is placed between two network layers corresponding to an input layer and an output layer adjacent to each other in the deep neural network, input values of nodes of the input layer multiplied by the corresponding weight are equal to an output value of nodes of the output layer.

A method of deep neural network compression is provided in an embodiment of the present disclosure. The method further includes: setting, by the processor, a loop parameter L so that a branch pruning and retraining is performed on each group of P weights from the first loop to the Lth loop, setting a threshold T corresponding to each loop, wherein the threshold T increases gradually from a first threshold T1 to an L threshold TL, the first threshold T1 is used at the beginning of the first loop, and the L threshold TL is used in the L loop.

A method of deep neural network compression is provided in an embodiment of the present disclosure. The method further includes: setting, by the processor, the weights less than the threshold T to 0 and retaining the weights greater than the threshold T when obtaining the weights of the same group in the same loop according to the threshold T, wherein when all of the weights of the same group in the same loop are less than the threshold T, only the largest weight is retained, and the remaining weights are set to 0, until the Lth loop of the last loop.

A method of deep neural network compression is provided in an embodiment of the present disclosure. The method further includes: performing, by the processor, the branch pruning and retraining on the Lth loop of the last loop, so that only one weight of each group is non-zero and the remaining weights are 0, wherein the remaining weights are evenly divided into branches to adjust a compression rate of the DNN and to adjust a reduction rate of the DNN to 1/p.

A method of deep neural network compression is provided in an embodiment of the present disclosure, wherein the DNN is a fully connected structure in which each node of the input layer is connected to each node of the output layer.

A method of deep neural network compression is provided in an embodiment of the present disclosure, wherein the packet formats of the weight have 16-bit, 12-bit and 8-bit formats, which are byte-aligned weight packing formats.

A method of deep neural network compression is provided in an embodiment of the present disclosure, wherein a binary fixed-point number extraction calculation is performed on the output value of the nodes of the output layer, wherein the number of digits before the decimal point of the output value of the nodes of the output layer plus the number of digits after the decimal point of the output value of the nodes of the output layer is 16 bits.

A method of deep neural network compression is provided in an embodiment of the present disclosure, wherein a binary fixed-point number extraction calculation is performed on the output value of the nodes of the output layer, wherein the number of digits before the decimal point of the output value plus at least 1 bit increased by adjustment, and plus the number of digits after the decimal point of the output value of the nodes of the output layer is 16 bits.

A method of deep neural network compression is provided in an embodiment of the present disclosure, wherein among the bits of the packet formats of the weight, at least one high bit counted from the highest bit is an address index, which is used to store an address corresponding to the input values of the nodes of the input layer; wherein the method further comprises: inputting, by a select terminal of a multiplexer of the processor, the address index; inputting, by an input of the multiplexer of the processor, the same group of weights; selecting, by the multiplexer of the processor, the input values of nodes of the input layer corresponding to the address index; and outputting, by an output of the multiplexer of the processor, the input values of the nodes of the input layer corresponding to the address index.

A method of deep neural network compression is provided in an embodiment of the present disclosure, wherein among the bits of the packet formats of the weight, the remaining bits are bits for storing the weights except for the address index represented by at least one high bit counted from the highest bit.

A method of deep neural network compression is provided in an embodiment of the present disclosure, wherein an address generator of the processor connected with a weight memory and input layer storage units is used as an address counter, and the bits of the packet formats of the weight are stored in the weight memory.

A device of deep neural network compression is provided in an embodiment of the present disclosure. The device of deep neural network compression comprises: a processor, configured to execute the following tasks: obtaining at least one weight of a deep neural network (DNN), setting a value of a P parameter, and combining every P weights in groups, wherein the weight is placed between two network layers corresponding to an input layer and an output layer adjacent to each other in the deep neural network, input values of nodes of the input layer multiplied by the corresponding weight are equal to an output value of nodes of the output layer; setting a loop parameter L so that a branch pruning and retraining is performed on each group of P weights from the first loop to the Lth loop, setting a threshold T corresponding to each loop, wherein the threshold T increases gradually from a first threshold T1 to an L threshold TL, the first threshold T1 is used at the beginning of the first loop, and the L threshold TL is used in the L loop; setting the weights less than the threshold T to 0 and retaining the weights greater than the threshold T when obtaining the weights of the same group in the same loop according to the threshold T, wherein when all of the weights of the same group in the same loop are less than the threshold T, only the largest weight is retained, and the remaining weights are set to 0, until the Lth loop of the last loop; and performing the branch pruning and retraining on the Lth loop of the last loop, so that only one weight of each group is non-zero and the remaining weights are 0, wherein the remaining weights are evenly divided into branches to adjust a compression rate of the DNN and to adjust a reduction rate of the DNN to 1/p.

BRIEF DESCRIPTION OF DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It should be appreciated that the drawings are not necessarily to scale as some components may be shown out of proportion to their size in actual implementation in order to clearly illustrate the concept of the present disclosure.

FIG. 10 is a schematic diagram illustrating a method for deep neural network compression according to an embodiment of the present disclosure.

DETAILED DESCRIPTION

The embodiments of the present disclosure will be described below based on FIGS. 1A to 10. This description is not intended to limit the implementation of the present disclosure, but is a kind of embodiment of the present disclosure.

FIG. 1B, FIG. 2B, FIG. 7 and FIG. 10 show a method for deep neural network compression according to an embodiment of the present disclosure. Optional local regular weight pruning is applied to the method. The method comprises Step 11 (S11), in which a processor 100 obtains at least one weight of a deep neural network (DNN), sets a value of a P parameter, and combines every P weights in groups, wherein the weight is placed between two network layers corresponding to an input layer (11, 21) and an output layer adjacent to each other in the deep neural network, and the input values of the nodes of the input layer (11, 21) multiplied by the corresponding weight are equal to the output values of the nodes of the output layer.

Figure 3:
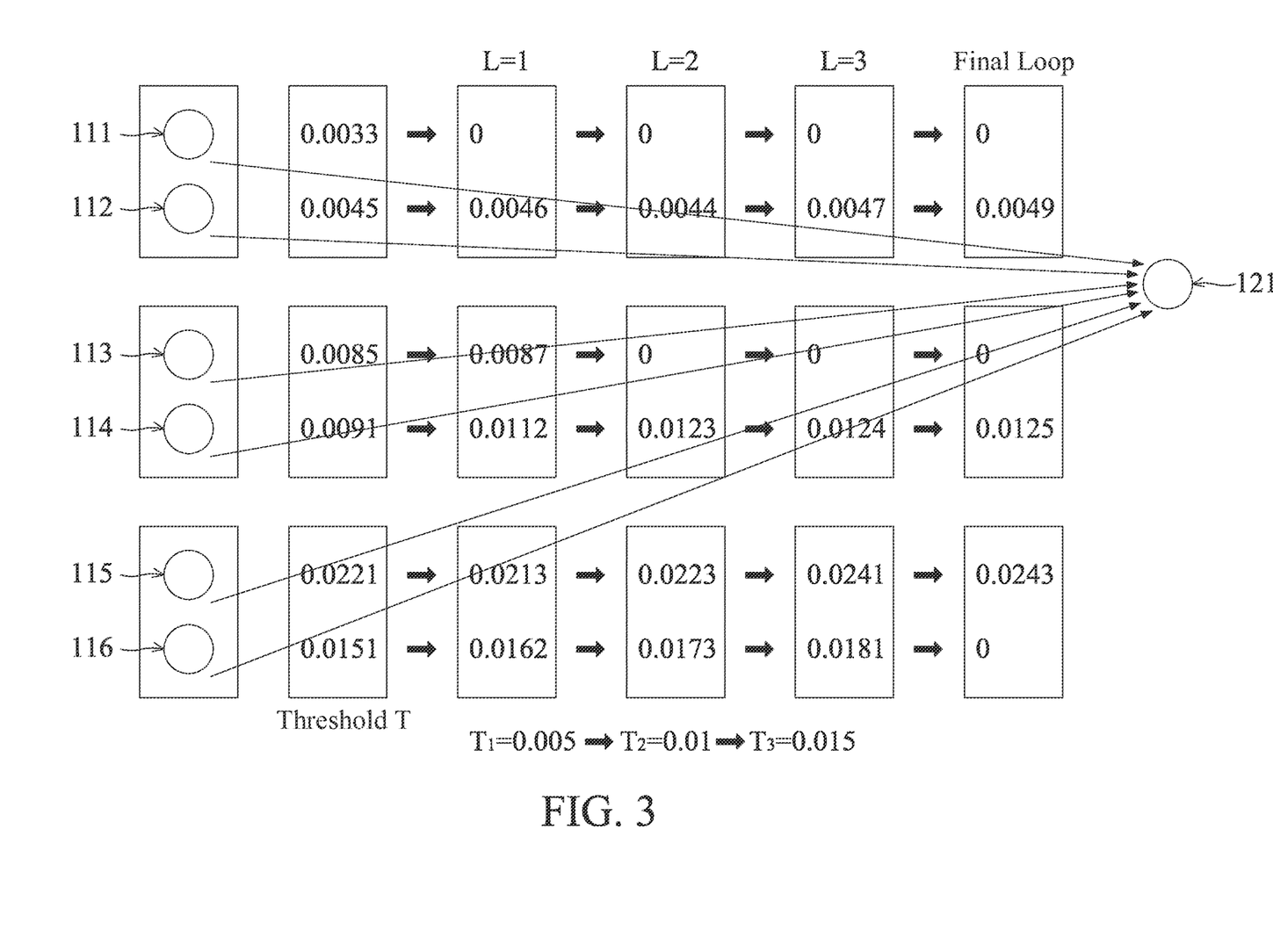
FIG. 3 is a schematic diagram of the branch pruning and retraining according to an embodiment of the present disclosure.
Figure 7:
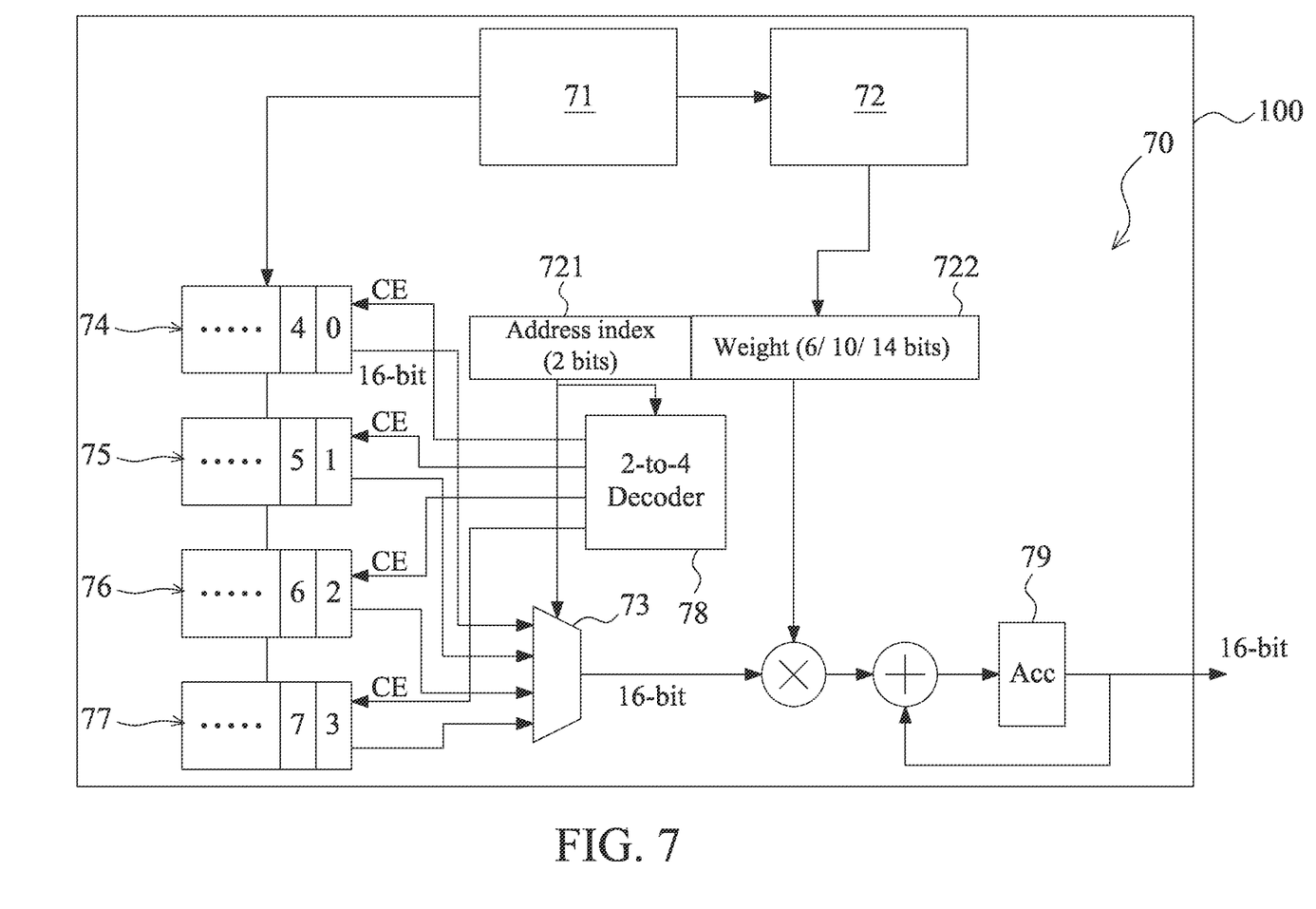
FIG. 7 is a schematic diagram of the design of the processor according to an embodiment of the present disclosure.

FIG. 3, FIG. 7 and FIG. 10 show a method for deep neural network compression according to an embodiment of the present disclosure. The method comprises Step 12 (S12), in which the processor 100 sets a loop parameter L so that a branch pruning and retraining is performed on each group of P weights from the first loop to the Lth loop, and sets a threshold T corresponding to each loop, wherein the threshold T increases gradually from a first threshold T1 to an L threshold TL. The first threshold T1 is used at the beginning of the first loop, and the L threshold TL is used in the L loop.

A method for deep neural network compression according to an embodiment of the present disclosure is shown in FIG. 3, FIG. 7 and FIG. 10. The method comprises Step 13 (S13), in which the processor 100 sets the weights that are less than the threshold T to 0 and retains the weights that are greater than the threshold T when obtaining the weights of the same group in the same loop according to the threshold T, wherein when all of the weights of the same group in the same loop are less than the threshold T, only the largest weight is retained, and the remaining weights are set to 0, until the Lth loop of the last loop. Similarly, when all of the weights of the same group in the same loop are less than the threshold T in the L loop, only the largest weight is retained, and the remaining weights are set to 0.

A method for deep neural network compression according to an embodiment of the present disclosure is shown in FIG. 7 and FIG. 10. The method comprises Step 14 (S14), in which the processor 100 performs the branch pruning and retraining on the Lth loop of the last loop, so that only one weight of each group is non-zero and the remaining weights are 0, wherein the remaining weights are evenly divided into branches to adjust the compression rate of the DNN and to adjust the reduction rate of the DNN to 1/p.

Figure 1A:
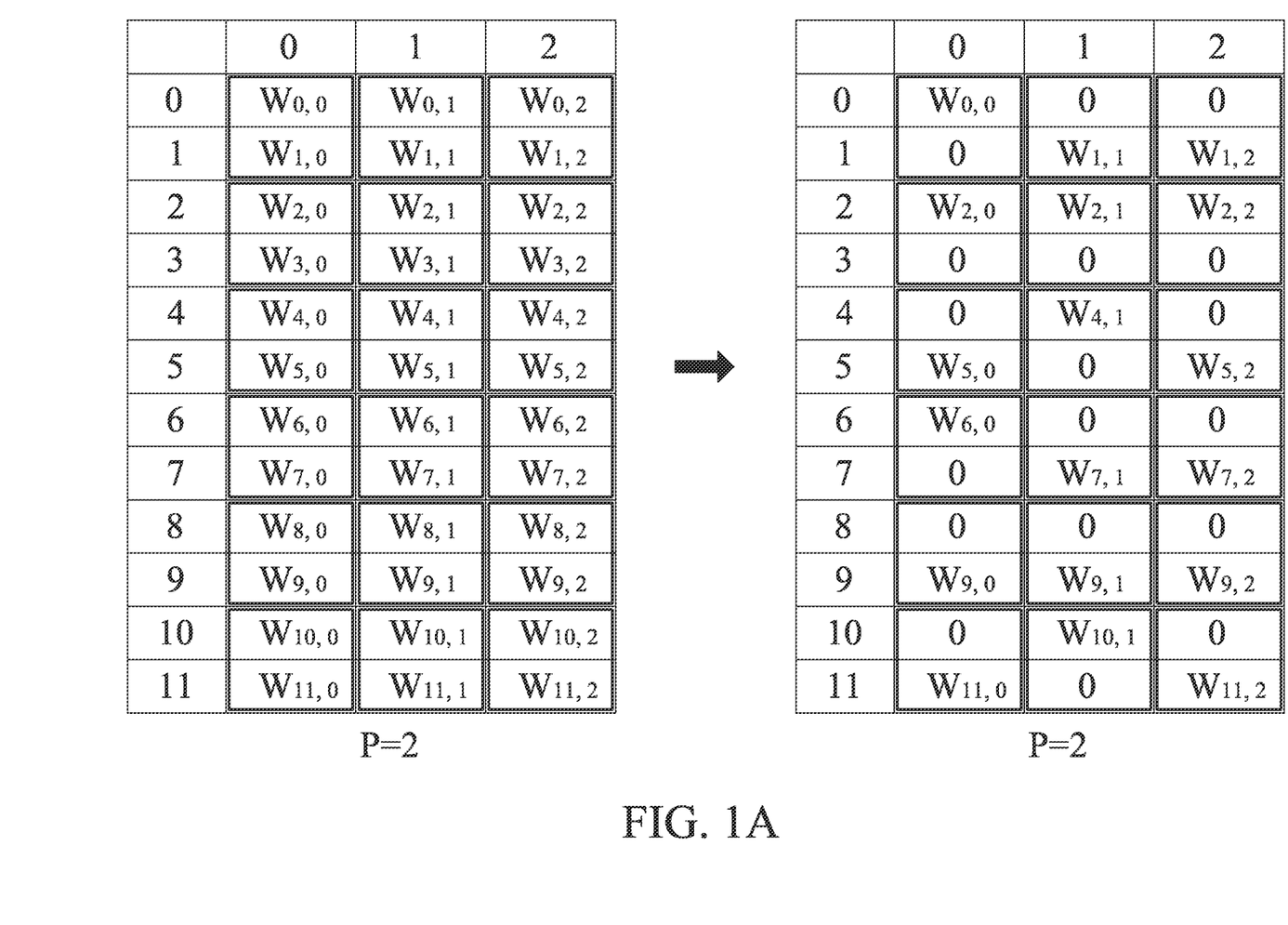
FIG. 1A is a schematic diagram of two-to-one evenly branched groups according to an embodiment of the present disclosure.
Figure 1B:
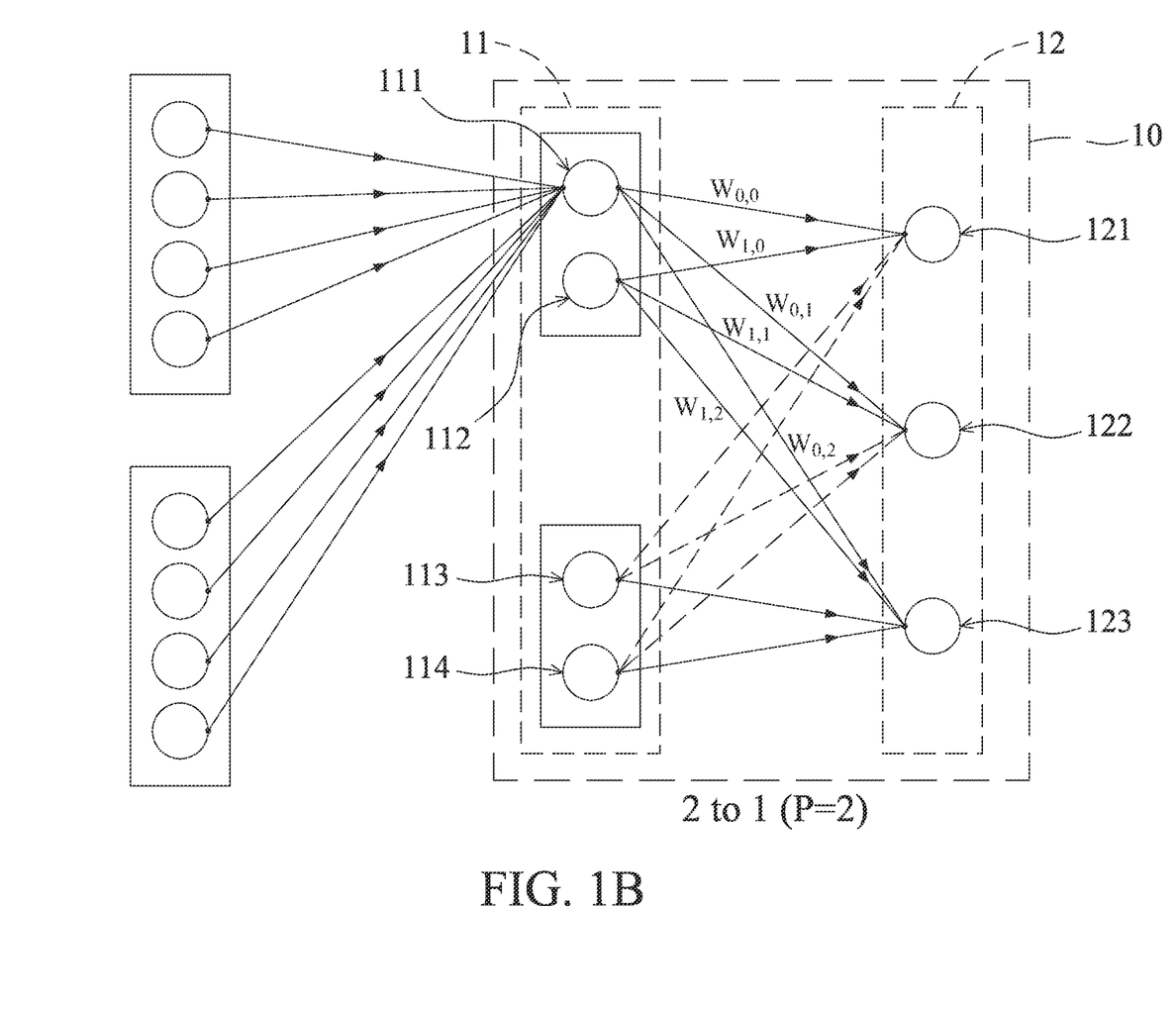
FIG. 1B is a schematic diagram of two-to-one evenly branched groups in a deep neural network according to an embodiment of the present disclosure.

FIGS. 1A and 1B are schematic diagrams of two-to-one evenly branched groups according to an embodiment of the present disclosure of a method for deep neural network compression. As shown in FIG. 1A, $W_{0,0}$~$W_{11,0}$ are weights, $W_{0,1}$~$W_{11,1}$ are weights, and $W_{0,2}$~$W_{11,2}$ are weights. Every two weights are one group. After the branch pruning of the present disclosure is performed, in each group of weights, only one weight is non-zero, and the remaining weights are 0.

As shown in FIG. 1B, a method for deep neural network compression according to an embodiment of the present disclosure, wherein the first group of network layers 10 has an input layer 11 and an output layer 12, and the first group of network layers 10 is a 2-to-1 network layer. When P=2, the input layer 11 has the corresponding weight $W_{0,0}$ between the first node 111 of the input layer and the first node 121 of the output layer 12. The input layer 11 has the corresponding weight $W_{1,0}$ between the second node 112 of the input layer 11 and the first node 121 of the output layer 12. The corresponding weight $W_{1,0}$ in FIG. 1B is 0. The corresponding weight $W_{0,0}$ in FIG. 1B is non-zero. The input value of the second node 112 of the input layer 11 multiplied by the corresponding weight $W_{1,0}$ equals to 0. Therefore, only the input value of the first node 111 of the input layer 11 is multiplied by the corresponding weight $W_{0,0}$ to generate the output value of the first node 121 of the output layer 12. Similarly, only the input value of the third node 113 of the input layer 11 is multiplied by the corresponding weight $W_{2,0}$ to generate the output value of the first node 121 of the output layer 12. The output values of the first node 121 of the output layer 12 are accumulated into the final output value. The first node 111 of the input layer 11 and the second node 112 of the input layer 11 are two as a group. In addition, the third node 113 of the input layer 11 and the fourth node 114 of the input layer 11 are a set of two. In the method for deep neural network compression provided in the present disclosure, the branch pruning is evenly performed on each group to reduce the huge calculation of the hardware.

Figure 2A:
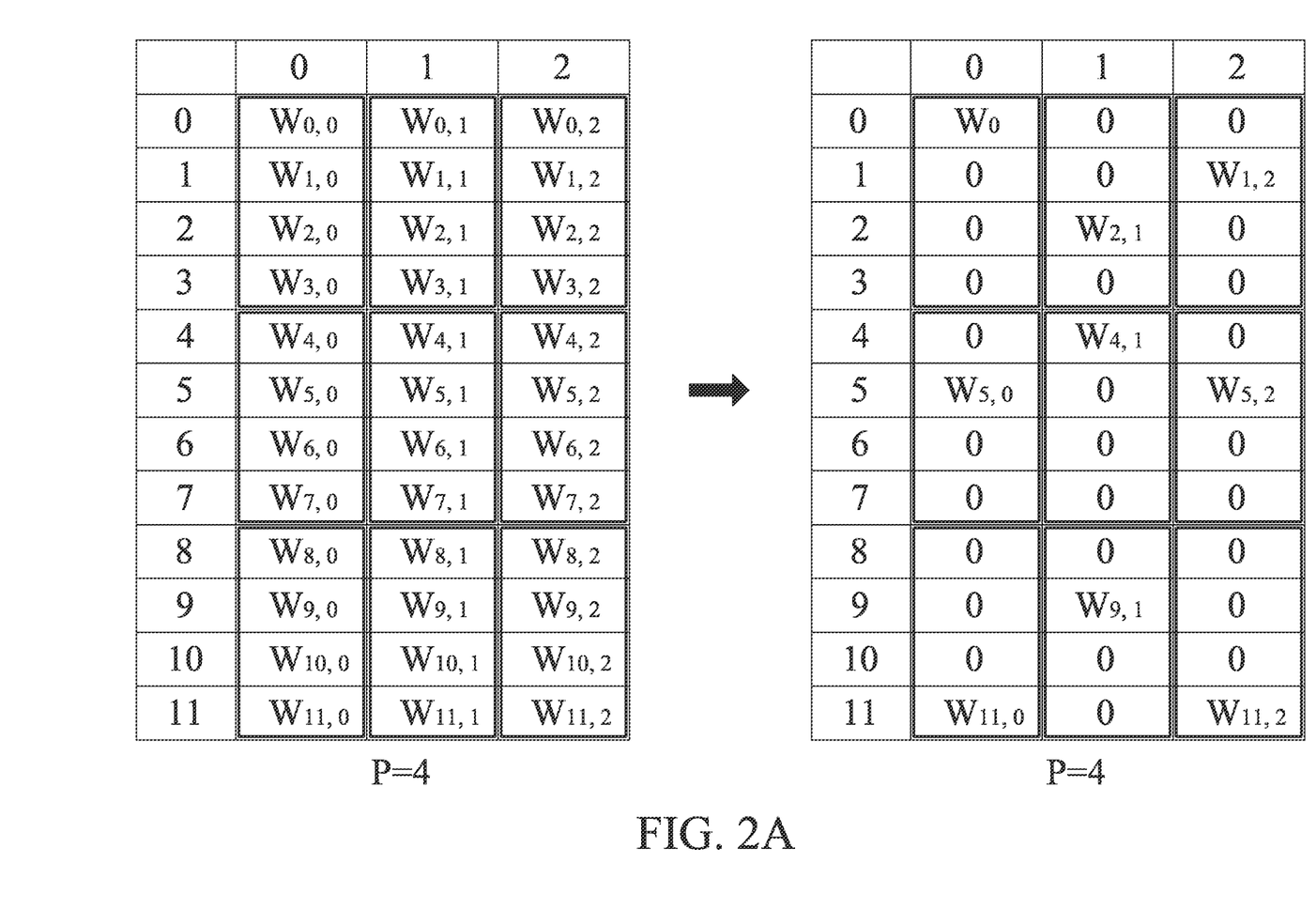
FIG. 2A is a schematic diagram of two-to-one evenly branched groups according to an embodiment of the present disclosure.
Figure 2B:
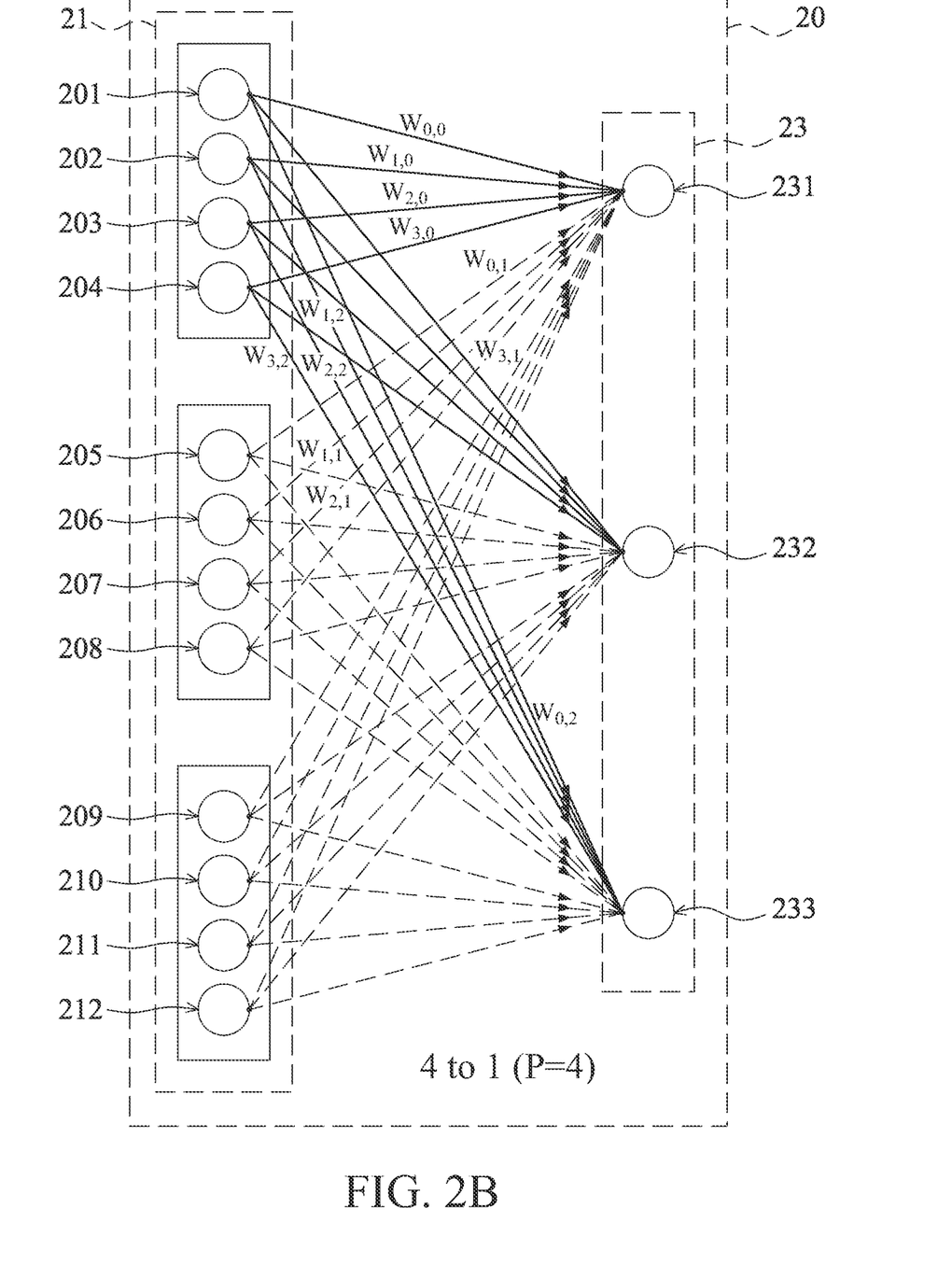
FIG. 2B is a schematic diagram of four-to-one evenly branched groups in a deep neural network according to an embodiment of the present disclosure.

As shown in FIGS. 2A and 2B, FIGS. 2A and 2B are schematic diagrams of four-to-one evenly branched groups according to an embodiment of the present disclosure of a method for deep neural network compression. As shown in FIG. 2A, $W_{0,0}$~$W_{11,0}$ are weights, $W_{0,1}$~$W_{11,1}$ are weights, and $W_{0,2}$~$W_{11,2}$ are weights. Every four weights are one group. After the branch pruning of the present disclosure is performed, in each group of weights, only one weight is non-zero, and the remaining weights are 0.

As shown in FIG. 2B, a method for deep neural network compression according to an embodiment of the present disclosure, wherein the second group of network layers 20 has an input layer 21 and an output layer 23, and the second group of network layers 20 is a 4-to-1 network layer. When P=4, the corresponding weights from the weight between the first node 201 of the input layer 21 and the first node 231 of the output layer 23 to the weight between the 12th node 212 of the input layer 21 and the first node 231 of the output layer 23 are weights $W_{0,0}$ to weight $W_{11,0}$, respectively. In FIG. 2B, the corresponding weights $W_{0,0}$ to $W_{11,0}$ are grouped in four, and only the weights $W_{0,0}$, $W_{5,0}$, and $W_{11,0}$ are non-zero, and the remaining weights are zero. The effect of only one weight in each group of four weights which is non-zero and the remaining weights which are zero is to reduce the number of calculations from the input layer to the output layer. In FIG. 2A, the corresponding weights $W_{0,0}$, $W_{5,0}$, and $W_{11,0}$ are non-zero. Similarly, the input value of the first node 201 of the input layer 21 is multiplied by the corresponding weight $W_{0,0}$ to generate the output value of the first node 231 of the output layer 23. The output value of the first node 231 of the output layer 23 which is generated after the input value of the first node 201 of the input layer 21 is multiplied by the corresponding weight $W_{0,0}$ is accumulated to the output value of the first node 231 of the output layer 23 which is generated after the input value of the 12th node 212 of the input layer 21 is multiplied by the corresponding weight $W_{11,0}$ to generate the final input value. The first node 201 to the fourth node 204 of the input layer 21 are branch grouped as a group of 4. In the method for deep neural network compression provided in the present disclosure, the branch pruning is evenly performed on each group by grouping to reduce the huge calculation of the hardware.

FIGS. 1B and 2B show a method for a deep neural network compression according to an embodiment of the present disclosure, wherein the deep neural network is formed by combining a plurality of network layers, each group of network layers of a deep neural network is adjacently connected by the input layer of the same group of network layers and the output layer of the same group of network layers, and the output layer of the previous group of network layers is the input layer of the next group of network layers.

FIG. 3 shows a method for a deep neural network compression according to an embodiment of the present disclosure, wherein the threshold T is initial threshold, the threshold T1 used for the first loop L1 is 0.005, the threshold T2 used for the second loop L2 is 0.01, the threshold T3 used for the third loop L3 is 0.015, and no threshold is used in the final loop. When P=2, every two weights are grouped as a group. The first group comprises the weight of the first node 111 of the input layer 11 that is 0.0033 and the weight of the second node 112 of the input layer 11 that is 0.0045. The second group comprises the weight of the third node 113 of the input layer 11 that is 0.0083 and the weight of the fourth node 114 of the input layer 11 that is 0.0091. The third group comprises the weight of the fifth node 115 of the input layer 11 that is 0.0221 and the weight of the sixth node 116 of the input layer 11 that is 0.0151.

FIG. 3 shows a method for a deep neural network compression according to an embodiment of the present disclosure. In the first loop, the threshold T1 is 0.005. In the first group, the weight greater than the threshold T1 is selected as a non-zero weight, and the weight less than the threshold T1 is set to 0. Since the weight of the first node 111 which is 0.0033 and the weight of the second node 112 which is 0.0046 are both less than the threshold T1, the larger weight of the two is retained, that is, the weight of the second node 112 is non-zero.

FIG. 3 shows a method for a deep neural network compression according to an embodiment of the present disclosure. In the second group of the first loop, the weights that are greater than the threshold T1 are selected as a non-zero weight, and the weights that are less than the threshold T1 are set to 0. Since the weight of the third node 113 which is 0.0087 and the weight of the fourth node 114 which is 0.0112 are both greater than the threshold T1, both the weight of the third node 113 and the weight of the fourth node 114 are retained.

FIG. 3 shows a method for a deep neural network compression according to an embodiment of the present disclosure. In the first group of the second loop, the weights that are greater than the threshold T2 are selected as a non-zero weight, and the weights that are less than the threshold T2 are set to 0. Since the weight of the first node 111 which is 0 and the weight of the second node 112 which is 0.0044 are both less than the threshold value T2, the larger weight of the two is retained, that is, the weight of the second node 112 is non-zero.

FIG. 3 shows a method for a deep neural network compression according to an embodiment of the present disclosure. In the third group of the third loop, the weights that are greater than the threshold T3 are selected as a non-zero weight, and the weight less than the threshold T3 are set to 0. Since the weight of the fifth node 115 which is 0.0241 and the weight of the sixth node 116 which is 0.0181 are both greater than the threshold T3, under the condition that only one weight is selected as non-zero, the larger weight of the two is retained as non-zero, and the smaller weight of the two (that is, the weight of the second node 112) is set to 0 instead of retaining the weights of both.

FIG. 3 shows a method for a deep neural network compression according to an embodiment of the present disclosure. In the final loop, only one weight which is non-zero is retained in each group.

Figure 4:
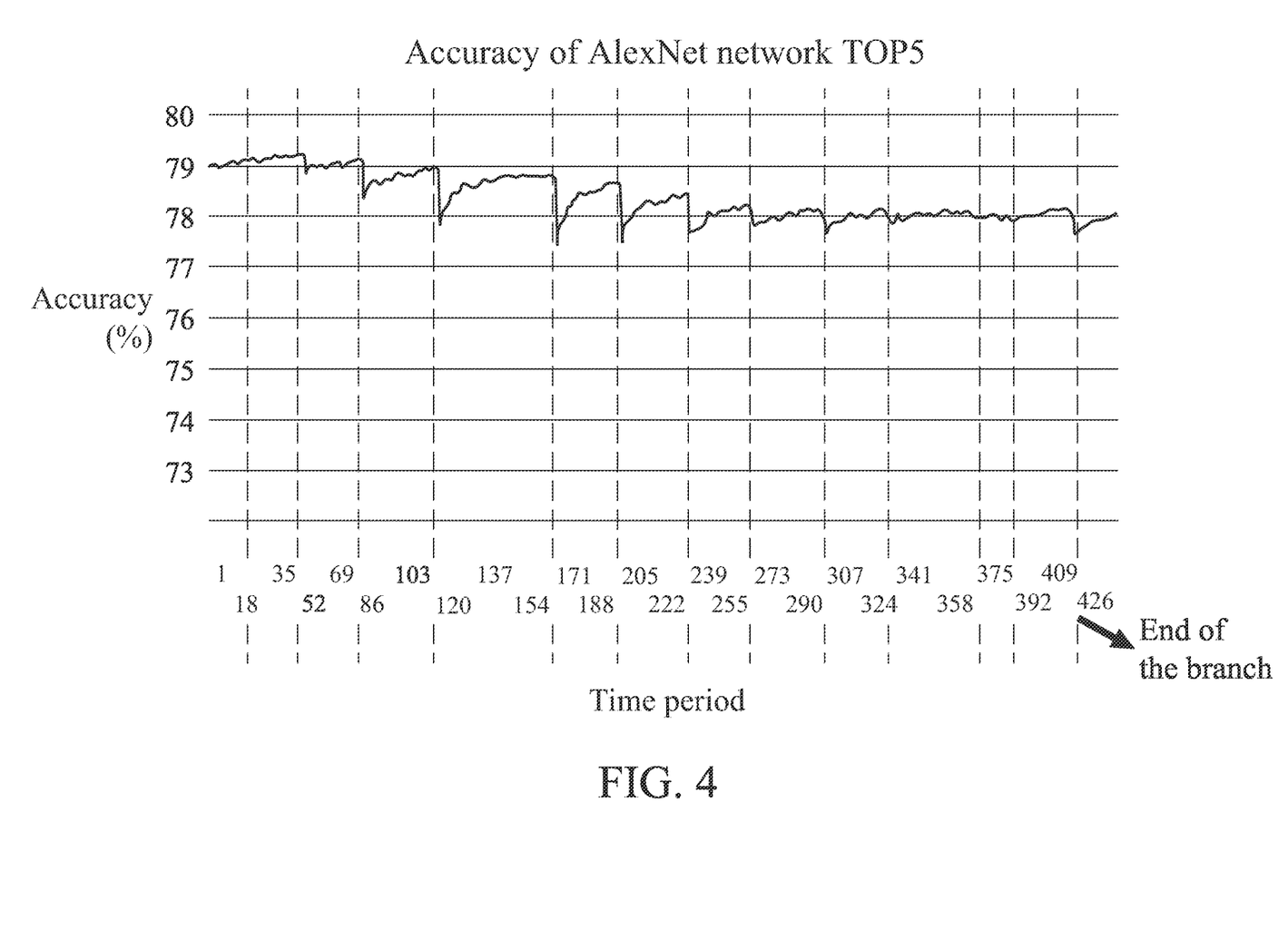
FIG. 4 is a diagram showing the accuracy how the accuracy of training the AlexNet network changes over time according to an embodiment of the present disclosure.

As shown in FIG. 4, according to a method for deep neural network compression according to an embodiment of the present disclosure, in the TOP5 mode of the AlexNet network, the horizontal axis is the time period, and the time period continues to increase until the end of the branch pruning. The vertical axis represents the corresponding accuracy.

Figure 5:
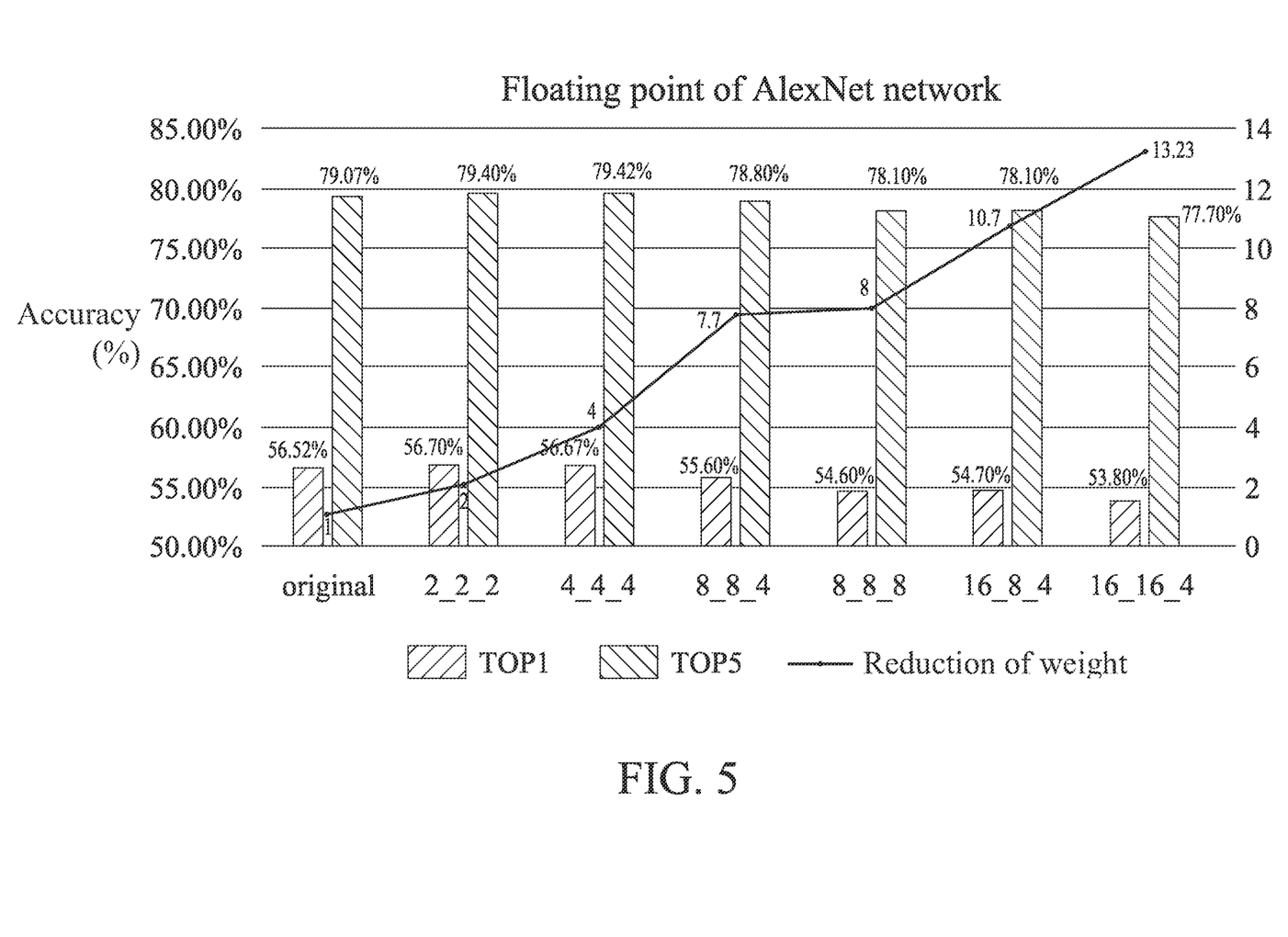
FIG. 5 is a comparison diagram of the corresponding accuracies of the AlexNet under the parameter settings according to an embodiment of the present disclosure.

FIG. 5 shows a schematic diagram of the corresponding accuracy of the reduction rate tested in the AlexNet network according to a method for deep neural network compression according to an embodiment of the present disclosure. In the two adjacent network layers, the weight reduction rate of 2 to 2 to 2 (2_2_2) is 2, and the accuracy is 79.40%. The weight reduction rate of 8 to 8 to 8 (8_8_8) is 8, and the accuracy is 78.10%. Until 16 to 16 to 4 (16_16_4), the weight reduction rate is 13.23, and the accuracy is 77.70%. TOP1 and TOP5 are the test modes selected in the AlexNet network.

Figure 6:
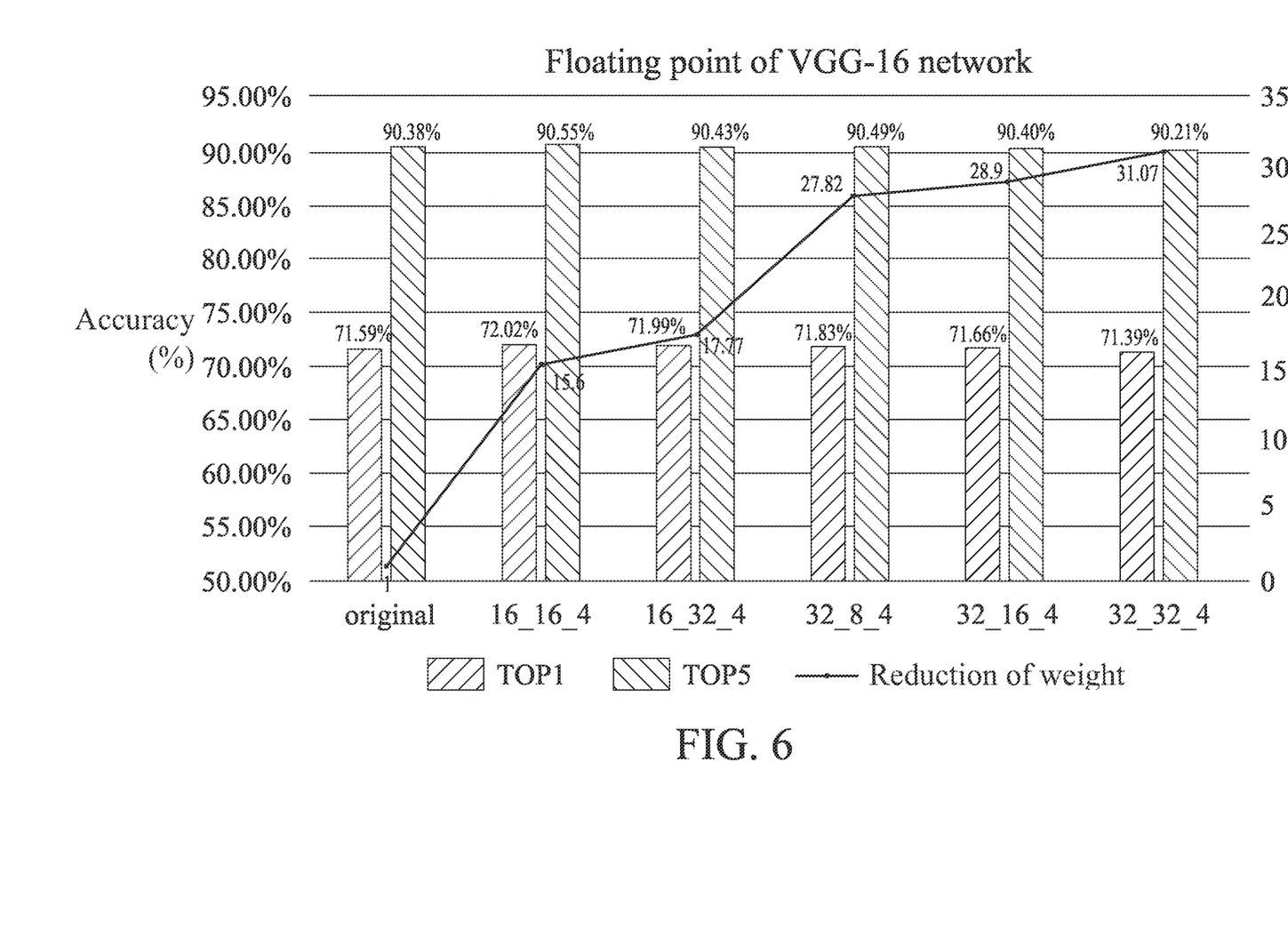
FIG. 6 is a comparison diagram of the corresponding accuracies of the VGG-16 under the parameter settings according to an embodiment of the present disclosure.

FIG. 6 shows a schematic diagram of the corresponding accuracy of the reduction rate tested in the VGG-16 network according to a method for deep neural network compression according to an embodiment of the present disclosure. In the two adjacent network layers, the weight reduction rate of 16 to 16 to 4 (16_16_4) is 15.62, and the accuracy is 90.55%. The weight reduction rate of 32 to 8 to 4 (32_8_4) is 27.82, and the accuracy is 90.49%. Until 32 to 32 to 4 (32_32_4), the weight reduction rate is 31.07, and the accuracy is 90.21%. TOP1 and TOP5 are the test modes selected in the VGG-16 network.

Figure 8:
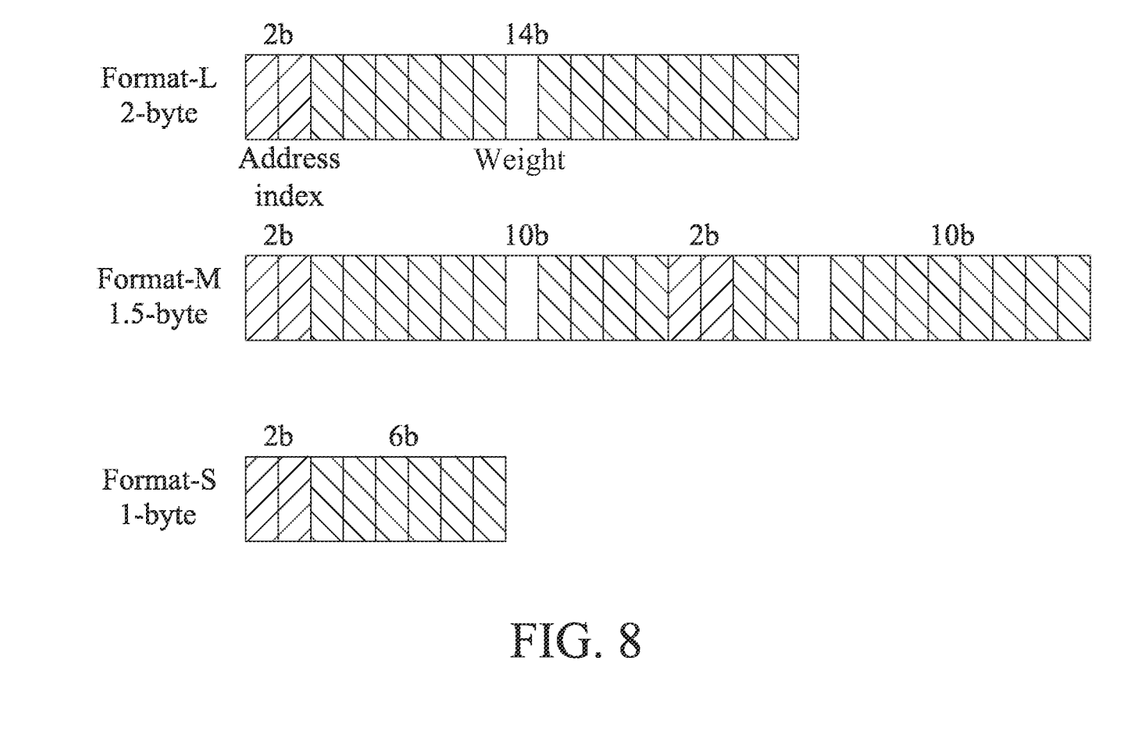
FIG. 8 is a schematic diagram of the bits of the packet formats of the weight according to an embodiment of the present disclosure.

As shown in FIG. 8, according to a method of deep neural network compression according to an embodiment of the present disclosure, the packet formats of the weight have 16-bit, 12-bit and 8-bit formats, which are byte-aligned weight packing formats.

Figure 9:
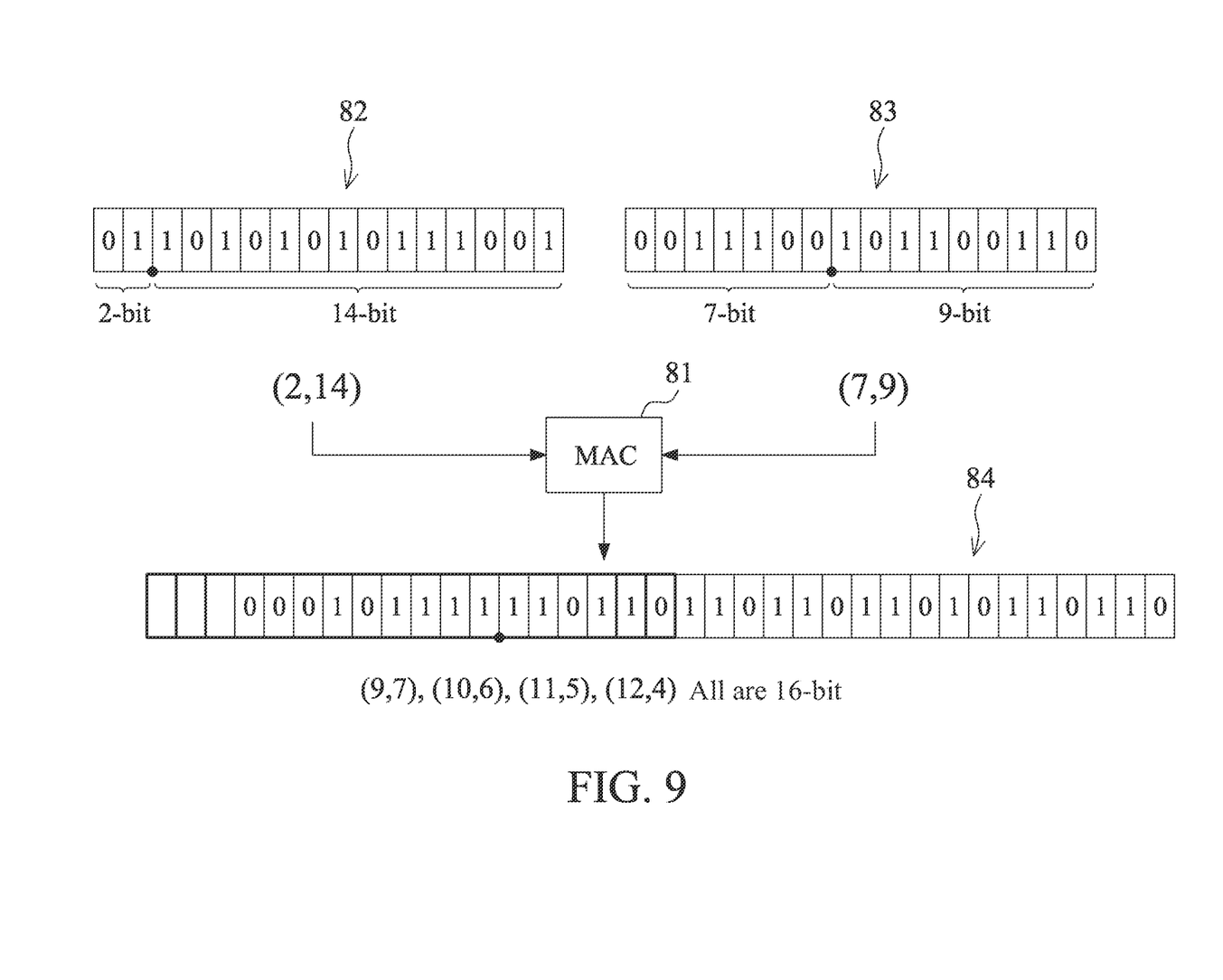
FIG. 9 is a schematic diagram of fixed-point number optimization layer by layer according to an embodiment of the present disclosure.

As shown in FIG. 9, according to a method of deep neural network compression according to an embodiment of the present disclosure, a binary fixed-point number extraction calculation is performed on the output value of the nodes of the output layer generated by the weight multiplied by the input values of nodes of the input layer via the multiplier 81, wherein the number of digits before the decimal point of the output value of the nodes of the output layer plus the number of digits after the decimal point of the output value of the nodes of the output layer is 16 bits.

As shown in FIG. 9, according to a method of deep neural network compression according to an embodiment of the present disclosure, a binary fixed-point number extraction calculation is performed on the output value of the nodes of the output layer generated by the weight multiplied by the input values of nodes of the input layer via the multiplier 81, wherein the number of digits before the decimal point of the output value plus at least 1 bit increased by adjustment, and plus the number of digits after the decimal point of the output value of the nodes of the output layer is 16 bits.

As shown in FIG. 7, according to a method for deep neural network compression according to an embodiment of the present disclosure, a processor 100 is used to perform the deep neural network compression. The processor 100 comprises an address generator 71 that is connected to a weight memory 72 and input layer storage units (74, 75, 76, 77) and used as an address counter. The bits of the packet formats of the weight are stored in the weight memory 72. The decoder 78 of the processor 100 connected to the weight memory 72 and at least one input layer storage (74, 75, 76, 77) is used as an address counter. In the embodiment, the processor 100 may be, for example, a computer device such as a hardware accelerator, a desktop computer, a notebook computer and so on.

FIGS. 7 and 8 show a method for deep neural network compression according to an embodiment of the present disclosure, wherein among the bits of the packet formats of the weight, at least one high bit counted from the highest bit is an address index 721, which is used to store an address corresponding to the input values of nodes of the input layer. A select terminal of a multiplexer 73 of the processor 100 inputs the address index 721. An input of the multiplexer 73 of the processor 100 inputs the same group of weights and the multiplexer 73 of the processor 100 selects the input values of nodes of the input layer corresponding to the address index 721. An output of the multiplexer 73 of the processor 100 outputs the input values of nodes of the input layer corresponding to the address index 721. Therefore, the address index 721 can make the multiplexer 73 select only one non-zero input value in a simple way. The input value is processed by the decoder 78 of the processor 100 as the address counter, and the multiplexer 73 output only one non-zero output value. The weight packet is composed of the highest bits which are the address index 721 and the weight bits 722, as shown in FIGS. 7 and 8. Therefore, the only one non-zero value output by the multiplexer 73 multiplied by the weight shown in FIG. 9 by the multiplier 81 to generate the output value of the nodes of the output layer. The output value of the nodes of the output layer is performed on the binary fixed-point number extraction calculation, wherein the number of digits before the decimal point of the output value of the nodes of the output layer plus the number of digits after the decimal point of the output value of the nodes of the output layer is 16 bits. In addition, in FIG. 9, The output value of the nodes of the output layer is performed on the binary fixed-point number extraction calculation, wherein the number of digits before the decimal point of the output value plus at least 1 bit increased by adjustment, and plus the number of digits after the decimal point of the output value of the nodes of the output layer is 16 bits. Therefore, after the output values are accumulated by an accumulator 79, an output in a 16-bit format is obtained. The byte-aligned weight packing formats are used in the decompressor hardware device of the present disclosure to achieve layer-by-layer fixed-point optimization, simple and low power consumption.

While the disclosure has been described by way of example and in terms of the preferred embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for deep neural network compression, comprising:
    obtaining, by a processor, at least one weight of a deep neural network (DNN), setting a value of a P parameter, and combining every P weights in groups, wherein P is a number, the at least one weight is placed between two network layers corresponding to an input layer and an output layer adjacent to each other in the deep neural network, the processor comprising input layer storage units having nodes, wherein the processor further comprises a multiplexer, wherein input values of the nodes of the input layer are multiplied at the multiplexer by respective weights in one of the groups to generate first output values, the first output values accumulated into a final output value which is equal to an output value of one of plural nodes of the output layer;
    setting, by the processor, a loop parameter L so that a branch pruning and retraining is performed on each group of P weights from the first loop to the Lth loop, setting a threshold T corresponding to each loop, wherein the threshold T increases gradually from a first threshold T1 to an L threshold TL, the first threshold T1 is used at the beginning of the first loop, and the L threshold TL is used in the Lth loop;
    for each loop, setting, by the processor, the weights less than the threshold T to 0 and retaining the weights greater than the threshold T when obtaining the weights of the same group in the same loop according to the threshold T, wherein when all of the weights of the same group in the same loop are less than the threshold T, only the largest weight is retained, and remaining weights are set to 0; and
    performing, by the processor, the branch pruning and retraining until the Lth loop, so that only one weight of each group is non-zero and the remaining weights are 0.

2. The method for deep neural network compression as claimed in claim 1, wherein the DNN is a fully connected structure in which each node of the input layer is connected to each node of the output layer.

3. The method for deep neural network compression as claimed in claim 1, wherein the DNN is a combination of multiple network layers, each group of network layers of the DNN is adjacently connected by the input layer of the same group of network layers and the output layer of the same group of network layers, and the output layer of the previous group of network layers is the input layer of the next group of network layers.

4. The method for deep neural network compression as claimed in claim 3, wherein packet formats of the weight have 16-bit, 12-bit and 8-bit formats.

5. The method for deep neural network compression as claimed in claim 4, wherein a binary fixed-point number extraction calculation is performed on the output value of the nodes of the output layer, wherein the number of digits before the decimal point of the output value of the nodes of the output layer plus the number of digits after the decimal point of the output value of the nodes of the output layer is 16 bits.

6. The method for deep neural network compression as claimed in claim 5, wherein a binary fixed-point number extraction calculation is performed on the output value of the nodes of the output layer, wherein the number of digits before the decimal point of the output value plus at least 1 bit increased by adjustment, and plus the number of digits after the decimal point of the output value of the nodes of the output layer is 16 bits.

7. The method for deep neural network compression as claimed in claim 5, wherein among the bits of the packet formats of the weight, at least one high bit counted from the highest bit is an address index, which is used to store an address corresponding to the input values of nodes of the input layer;
    wherein the method further comprises:
    inputting, by a select terminal of the multiplexer of the processor, the address index;
    inputting, by an input of the multiplexer of the processor, the weights of the same group;
    selecting, by the multiplexer of the processor, the input values of nodes of the input layer corresponding to the address index; and
    outputting, by an output of the multiplexer of the processor, the input values of the nodes of the input layer corresponding to the address index.

8. The method for deep neural network compression as claimed in claim 7, wherein among the bits of the packet formats of the weight, remaining bits are bits for storing the weights except for the address index represented by at least one high bit counted from the highest bit.

9. The method for deep neural network compression as claimed in claim 7, wherein an address generator of the processor connected with a weight memory and the input layer storage units is used as an address counter, and the bits of the packet formats of the weight are stored in the weight memory.

10. A device for deep neural network compression, comprising:
    a processor, configured to execute the following tasks:
        obtaining at least one weight of a deep neural network (DNN), setting a value of a P parameter, and combining every P weights in groups, wherein P is a number, the at least one weight is placed between two network layers corresponding to an input layer and an output layer adjacent to each other in the deep neural network, the processor comprising input layer storage units having nodes, wherein the processor further comprises a multiplexer, wherein input values of the nodes of the input layer are multiplied at the multiplexer by respective weights in one of the groups to generate first output values; the first output values accumulated into a final output value which is equal to an output value of one of plural nodes of the output layer;
        setting a loop parameter L so that a branch pruning and retraining is performed on each group of P weights from the first loop to the Lth loop, setting a threshold T corresponding to each loop, wherein the threshold T increases gradually from a first threshold T1 to an L threshold TL, the first threshold T1 is used at the beginning of the first loop, and the L threshold TL is used in the Lth loop;

for each loop, setting the weights less than the threshold T to 0 and retaining the weights greater than the threshold T when obtaining the weights of the same group in the same loop according to the threshold T, wherein when all of the weights of the same group in the same loop are less than the threshold T, only the largest weight is retained, and remaining weights are set to 0; and performing the branch pruning and retraining until the Lth loop of the last loop, so that only one weight of each group is non-zero and the remaining weights are 0.

11. The device for deep neural network compression as claimed in claim 10, wherein the DNN is a fully connected structure in which each node of the input layer is connected to each node of the output layer.

12. The device for deep neural network compression as claimed in claim 10, wherein the DNN is a combination of multiple network layers, each group of network layers of the DNN is adjacently connected by the input layer of the same group of network layers and the output layer of the same group of network layers, and the output layer of the previous group of network layers is the input layer of the next group of network layers.

13. The device for deep neural network compression as claimed in claim 12, wherein packet formats of the weight have 16-bit, 12-bit and 8-bit formats.

14. The device for deep neural network compression as claimed in claim 13, wherein a binary fixed-point number extraction calculation is performed on the output value of the nodes of the output layer, wherein the number of digits before the decimal point of the output value of the nodes of the output layer plus the number of digits after the decimal point of the output value of the nodes of the output layer is 16 bits.

15. The device for deep neural network compression as claimed in claim 14, wherein a binary fixed-point number extraction calculation is performed on the output value of the nodes of the output layer, wherein the number of digits before the decimal point of the output value plus at least 1 bit increased by adjustment, and plus the number of digits after the decimal point of the output value of the nodes of the output layer is 16 bits.

16. The device for deep neural network compression as claimed in claim 14, wherein among the bits of the packet formats of the weight, at least one high bit counted from the highest bit is an address index, which is used to store an address corresponding to the input values of nodes of the input layer;

wherein the processor further executes the following tasks:

inputting, by a select terminal of the multiplexer of the processor, the address index;

inputting, by an input of the multiplexer of the processor, the weights of the same group;

selecting, by the multiplexer of the processor, the input values of nodes of the input layer corresponding to the address index; and outputting, by an output of the multiplexer of the processor, the input values of the nodes of the input layer corresponding to the address index.

17. The device for deep neural network compression as claimed in claim 16, wherein among the bits of the packet formats of the weight, remaining bits are bits for storing the weights except for the address index represented by at least one high bit counted from the highest bit.

18. The device for deep neural network compression as claimed in claim 16, wherein an address generator of the processor connected with a weight memory and the input layer storage units is used as an address counter, and the bits of the packet formats of the weight are stored in the weight memory.

* * * * *